United States Patent [19]

Derby

[11] Patent Number: 4,919,586

[45] Date of Patent: Apr. 24, 1990

[54] MECHANICAL CLOSED LOOP ROBOTIC ARM END EFFECTOR POSITIONING SYSTEM

[75] Inventor: Stephen J. Derby, Brunswick, N.Y.

[73] Assignee: Grasp, Inc., Troy, N.Y.

[21] Appl. No.: 198,478

[22] Filed: May 25, 1988

[51] Int. Cl.$^5$ ............................................. B66C 1/00

[52] U.S. Cl. .................................... 414/735; 901/45; 414/626

[58] Field of Search .................. 901/45, 27, 9, 35, 30, 901/41; 269/289 R; 414/222, 626, 729, 732, 733, 736, 738, 735; 198/345

[56] References Cited

U.S. PATENT DOCUMENTS

| | | | |
|---|---|---|---|
| 3,984,006 | 10/1976 | Takeyasu et al. | |
| 4,049,500 | 9/1977 | Kamm | 198/345 |
| 4,098,001 | 7/1978 | Watson | 33/169 C |
| 4,145,802 | 3/1979 | d'Auria | 29/568 |
| 4,201,284 | 5/1980 | Brems | 198/345 |
| 4,202,107 | 5/1980 | Watson | 901/45 X |
| 4,242,017 | 12/1980 | De Fazio | 901/45 X |
| 4,283,153 | 8/1981 | Brendamour | 403/53 |
| 4,290,203 | 9/1981 | Rebman | 33/169 C |
| 4,332,066 | 6/1982 | Hailey et al. | 901/45 X |
| 4,390,172 | 6/1983 | Gotman | 198/345 X |
| 4,414,750 | 11/1983 | De Fazio | 33/185 R |
| 4,537,557 | 8/1985 | Whitney | 901/45 X |
| 4,562,391 | 12/1985 | Inoue | 901/9 X |
| 4,586,702 | 5/1986 | Chambers | 198/345 X |
| 4,662,503 | 5/1987 | Lycke | 198/345 |
| 4,676,492 | 6/1987 | Shamir | 269/73 |

FOREIGN PATENT DOCUMENTS

| | | | |
|---|---|---|---|
| 0083410 | 7/1983 | European Pat. Off. | 901/45 |
| 0124530 | 7/1984 | Japan | 901/45 |
| 0120937 | 6/1987 | Japan | 901/45 |

OTHER PUBLICATIONS

"A Survey of Standard End Effectors and Their Roles in Custom Design", George Klein, Robotic End Effectors: Design & Applications Conf., 6/17-18/86.

"End Effector Design Guidelines for Machine Loading & Material Handling Applications", Martin Rosenkranz, II, Robotic End Effectors: Design & Applications Conference, 3/19-20/85.

"Mechanical Memory Device for Robot Linear Compliance End Effectors", D. J. McAte, A. D. Nguyen & F. C. Padilla, IBM Tech. Disclosure Bulletin, vol. 27, No. 9, 2/85.

"End Effector with Diagonal and Rotational Compliance Mechanism", IBM Technical Disclosure Bulletin, vol. 28, No. 7, Dec. 1985, pp. 2992-2997.

"Compliant End Effector for Attachment to a Robotic Arm", IBM Technical Disclosure Bulletin, vol. 28, No. 6, Nov. 1985, pp. 2430-2431.

"Robot Accuracy Issued and Methods of Improvement", Chia P. Day, Robotics Today, vol. 1, Spring 1988, pp. 1-12.

*Primary Examiner*—Frank E. Werner
*Assistant Examiner*—James T. Eller, Jr.
*Attorney, Agent, or Firm*—Heslin & Rothenberg

[57] ABSTRACT

A mechanical closed loop robotic arm end effector positioning system which produces a precision reference frame with an associated workpiece fixture or other robotic manipulator system is disclosed. The positioning system results in decoupling of end effector operation from gross movement inaccuracies or vibrations of the robotic arm, thus allowing less precise robots to perform high precision tasks. The system includes a wrist assembly which is mountable to the robotic arm near the arm's distal functional end. The wrist assembly has a compliant member and a first positioning member connected thereto. The first positioning member includes a first docking arrangement. A second positioning member associated with the workpiece fixture includes a second docking arrangement. The first and second docking arrangements are sized and positioned to engageably mate within the robotic arm's resolution when the robotic arm attains a target position relative to the workpiece fixture. The compliant member provides rotational and translational freedom of movement for the docking arrangements to mate as the robotic arm attains its target coordinates and orientation. In further embodiments, the second positioning member is capable of two-dimensional movement in a plane parallel to the plane of the workpiece fixture, and an embodiment for locating two robotic arm and effectors relative to one another is provided.

23 Claims, 7 Drawing Sheets

MECHANICAL CLOSED LOOP ROBOTIC ARM END EFFECTOR POSITIONING SYSTEM

BACKGROUND OF THE INVENTION

1. Technical Field

This invention relates in general to robotics and, more particularly, to a unique mechanical robotic arm positioning system which produces a closed loop reference frame with an associated workpiece fixture or other robotic system, thereby decoupling operation of the end effector from gross movement inaccuracies or vibrations of the robotic arm and allowing less precise robots to perform high precision tasks.

2. Description of the Prior Art

Due to its cost effectiveness, robotics will continue to be increasingly important to successful competition within many industries. An industrial robot is broadly defined as a reprogrammable, multifunctional manipulator designed to move material, parts, tools, and specialized devices through variable programmed motions for performance of a variety of tasks. Commonly performed tasks include drilling, welding, spray painting, and "pick-and-place" operations. While the majority of present industrial robotic systems are acceptable for such operations, these "less precise" systems experience serious problems in applications for which a high degree of positioning precision is essential, such as with many assembly and inspection tasks. For example, very stringent tolerances are usually involved in the assembly of small electronic parts. Further, limited space between parts or components often presents additional restrictions, such as is the case with the assembly of printed circuit boards.

A typical industrial robotic system comprises a number of interconnected arm segments at the end of which is located an end effector, e.g., a gripper or micromanipulator. Gear backlash, bending deflections and calibration errors are some of the reasons for positional and rotational errors unavoidably created with respect to a target three-dimensional and angular position. The errors accumlate from the proximal arm member to the distal functional end effector. A thorough discussion of the robotic accuracy issue is provided by Chia P. Day in an article entitled: "Robot Accuracy Issues and Methods of Improvement", published by Robotics Today, Vol. 1, No. 1, Spring, 1988 edition.

Prior art devices have almost exclusively centered on correcting such errors or deviations of movement through complicated and expensive sensor and feedback means as typified by recently developed laser tracking techniques. Although such tracking systems do provide a more accurate determination of end effector position, they tend to be more complex and costly than feasible for most industrial robotic systems, and often demand precise coordinates for the entire robot path rather than simply a target location and orientation. Further, existing devices typically require that an end effector be replaced in exactly the same position if removed for maintenance or replacement, or else all previously programmed points will be offset.

Another prior art device is disclosed by Inoue in U.S. Pat: No. 4,562,391, entitled "Robotic Positioning System". Briefly, the Inoue patent describes a positioning system for an electrical discharge machining (EDM) center which includes a gyroscope assembly. The gyroscope provides directional reference for monitoring the accuracy of a spatial orientation assumed by any of the innerconnected arm members, the hand member or tool electrode at the distal end of the system, once a predetermined movement is achieved. As with the laser tracking system, however, this approach is more complex and costly than feasible for most industrial applications The Inoue patent also describes a fail-safe for the discussed EDM system which includes a first positioning plate having the workpiece securely mounted thereon with a plurality of pins projecting from the plate. A second positioning plate is detachably mounted on the electrode holder and has a plurality of holes bored therein. The pins and holes are arranged so that when the electrode surface of the tool electrode is properly positioned with respect to the workpiece, the holes are capable of fully accepting the pins, thereby providing a check on whether the electrode at the distal end of the robotic system has been properly positioned relative to the workpiece by the gyro assembly.

As noted, the Inoue gyro assembly is believed more complex and costly than acceptable for most industrial applications. Further, the described fail-safe enhancement is of no value to proper positioning of the tool electrode. The gyro assembly maintains the reference frame on the electrode holder positioning plate parallel to the workpiece positioning plate at all times. There is no force feedback or sensoring information on whether the electrode holder positioning plate has come into contact with the pins of the workpiece positioning plate. The documented process would tend to ream out the bored holes if the robotic system is not truly already accurate, i.e., sufficiently accurate for the pins to be inserted into the corresponding holes without wedging or jamming problems arising.

Therefore, a novel positioning system which is less complex and costly than presently available robotic positioning systems and which allows high precision robotic assembly by "less precise" industrial robots is believed clearly desirable.

SUMMARY OF THE INVENTION

As noted initilly and more fully described herein, the present invention comprises a mechanical closed loop system for locating a robotic arm end effector relative to a workpiece fixture or other robotic system for the performance of high precision tasks. The system includes a wrist assembly which is mountable to the robotic arm near the arm's distal functional end. The wrist assembly has a compliant member and a first positioning member connected to the compliant member. The first positioning member includes a first docking means. A second positioning member associated with the workpiece fixture includes a second docking means. The first and second docking means are sized and positioned to engagably mate within the robotic arm's resolution when the robotic arm attains a target position above the workpiece fixture. The compliant member provides rotational and translational freedom of movement for the first docking means to mate with the second docking means as the robotic arm attains said target coordinates. Docking of the first and second positioning members beneficially produces a mechanical closed loop reference frame which separates operation of the end effector from any gross movement inaccuracies or vibrations of the robotic arm.

In an enhanced version, the invention includes a second positioning member which is capable of two dimensional movement in a plane parallel to the plane of the workpiece fixture. The movable second positioning member, having the second docking means associated therewith, is located between the robotic arm end effector and the workpiece fixture when said first and second docking means are engagably mated and includes an opening through which the end effector communicates with a workpiece to perform the desired operational task.

In another embodiment of the invention useful for locating a first robotic arm end effector relative to a second robotic arm end effector, the system includes a first wrist assembly mountable to the first robotic arm and a second wrist assembly mountable to the second robotic arm. The first wrist assembly includes a first compliant member and a first positioning member secured to the first compliant member. The second wrist assembly includes a second positioning member. The first positioning member and second positioning member include a first docking means and a second docking means, respectively. Again, the first docking means and second docking means are sized and positioned to engagably mate within the resolution of the first and second robotic arms when the robotic arms attain target coordinates. The compliant member provides rotational and translational freedom of movement for the first docking means to mate with the second docking means as the robotic arms attain said target coordinates. Once the first and second positioning members dock, a mechanical closed loop reference frame is produced which separates operation of the first robotic arm end effector and the second robotic arm end effector from any gross movement inaccuracies or vibrations attributable to the first and second robotic arms.

Accordingly, a principal object of the present invention is to provide a mechanical closed loop system connectable to a robotic arm for locating the arm's end effector relative to a workpiece fixture or other robotic system.

Another object of the present invention is to provide such a mechanical closed loop locating system which allows a less precise robotic manipulator to perform high precision tasks.

Yet another object to the present invention is to provide such a mechanical closed loop locating system which is less complex and less expensive than any heretofore known robotic positioning system.

A further object of the present invention is to provide such a mechanical closed loop locating system which isolates end effector operation from gross robotic arm movement inaccuracies and/or vibrations.

A but further object of the present invention is to provide such a mechanical closed loop locating system which is versatile and capable of being readily detachably mounted to any standard industrial robotic manipulator.

BRIEF DESCRIPTION OF THE DRAWINGS

These and other objects, advantages and features of the present invention will be more readily understood from the following detailed description when considered in conjunction with the accompanying drawings in which.

DETAILED DESCRIPTION OF THE INVENTION

Figure 1:
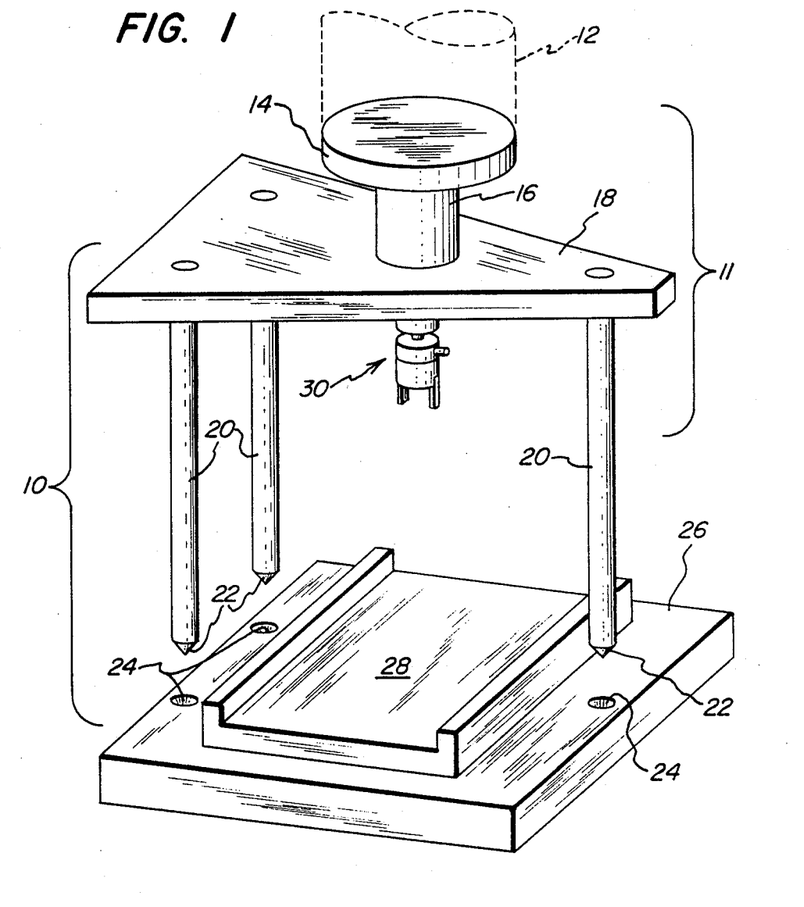
FIG. 1 is a perspective view of one embodiment of the mechanical closed loop locating system of the present invention.

Referring now to FIG. 1, a first form of the mechanical closed loop system 10 of this invention is illustrated. System 10 includes a wrist assembly 11 attachable to a robot manipulator or arm 12 via a mounting plate 14 and any standard securing means, such as bolts or screws (not shown). Alternatively, if desired, plate 14 can be configured to engage manipulator 12 via a quick exchange wrist coupling which itself is rigidly attached to the manipulator. A compliant coupling 16, comprising, e.g., a block of rubber or other elastomeric material, or a spring mechanism, connects mounting plate 14 to an upper fixture plate 18. Compliant coupling 16 allows for translation and rotation of plate 18 in three dimensions relative to plate 14 fixedly secured to manipulator 12.

Attached to upper fixture plate 18 are three positioning legs 20, each of which have a male conical shaped free end 22. Free ends 22 are constructed for precision docking within corresponding female conical shaped receptacles or ports 24 (see FIG. 2) in a lower fixture plate 26. Ports 24 are positioned and configured to accommodate ends 22 of legs 20 as manipulator 12 reaches a target position above a workpiece (not shown) located within a part fixture 28 secured to lower fixture plate 26. If desired, lower fixture plate 26 and part fixture 28 can comprise a unitary workpiece fixture.

Figure 2:
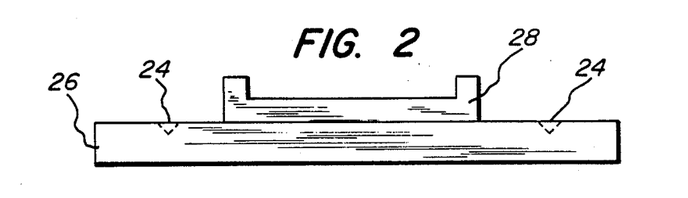
FIG. 2 is a front elevational view of the workpiece fixture illustrated in FIG. 1.

Docking of male conical free ends 22 in female conical ports 24 is facilitated by compliant coupling 16 which allows upper fixture plate 18 and legs 20 to rotate and translate properly to fully matably engage the ports as manipulator 12 reaches its programmed target position. Manipulator arm 12 need only achieve a rotational and translational accuracy sufficient to place free ends 22 of legs 20 within the female conical volumes of ports 24, which are appropriately sized to facilitate this object. For example, an industrial robotic manipulator typically has an accuracy resolution of anywhere between 1/10 and 1/100 of an inch of a programmed target position. Thus, although ports 24 are precision located for exact positioning of ends 22, they include tapered leads sufficient to accomodate the manipulator's accuracy resolution. Once ends 22 are within the female conical volumes, manipulator 12 in combination with compliant coupling 16 forces the male conical surfaces into mating relation with the female conical surfaces. With the docking of ends 22 within ports 24, the physical location of the closed loop system is registered in all directions and orientations relative to lower fixture plate 26 and part fixture 28.

Also attached to upper fixture plate 18 is an end effector 30 such as a gripper, any standard tooling or a micromanipulator. End effector 30 performs a desired operational task after ends 22 dock within ports 24 to achieve the precision reference position, thereby decoupling operation of end effector 30 from any inaccuracies or vibrations of manipulator 12. Alternatively, if desired, system 10 can be configured to attach to a manipulator without replacing or impairing functioning of the manipulator's existing end effector. By isolating the end effector from gross movement inaccuracies and/or vibrations of the manipulator, high precision tasks may be performed, e.g., on the order of 1/1000 of an inch resolution or better, notwithstanding that the robotic manipulator's own resolution may be only 1/10 to 1/100 of an inch.

End effector 30 can have only one or several rotational and/or translational actuators, operating in either parallel and/or serial mechanical chains. A gripper device, or devices, located on such mechanical chains can be used to assist or perform a desired operational task. A discussion of existing end effectors is provided in "A Survey of Standard End Effectors and Their Roles in Custom Design" authored by George Kline and presented at Robotic End Effectors: Design in Applications Conference of June 17 & 18, 1986 in Plymouth, Mich. In addition, an overview of end effector design guidelines is described in "End Effector Design Guidelines for Machine Loading and Material Handling Application" authored by Martin J. Rosenkranz, III, and presented at Robotics End Effectors: Design in Applications Conference of Mar. 19 & 20, 1985 in Livonia, Mich. The presentations were subsequently published by The Society of Manufacturing Engineers, both of which are incorporated herein by reference.

Figure 3:
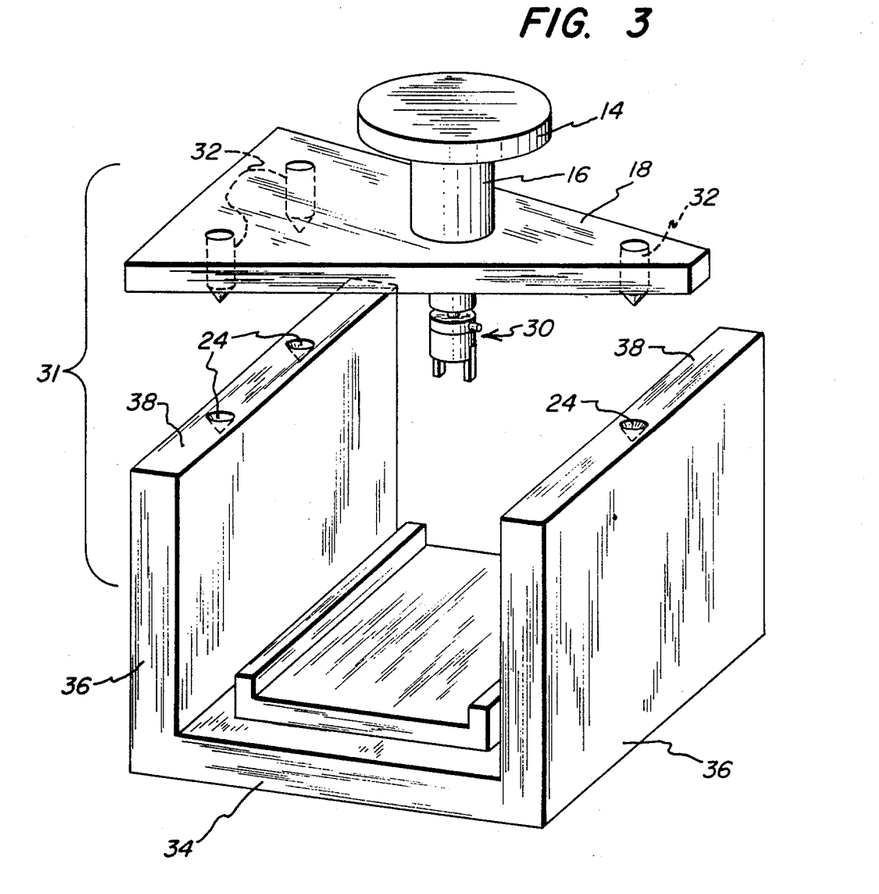
FIG. 3 is a perspective view of another embodiment of the mechanical closed loop locating system of the present invention.
Figure 4:
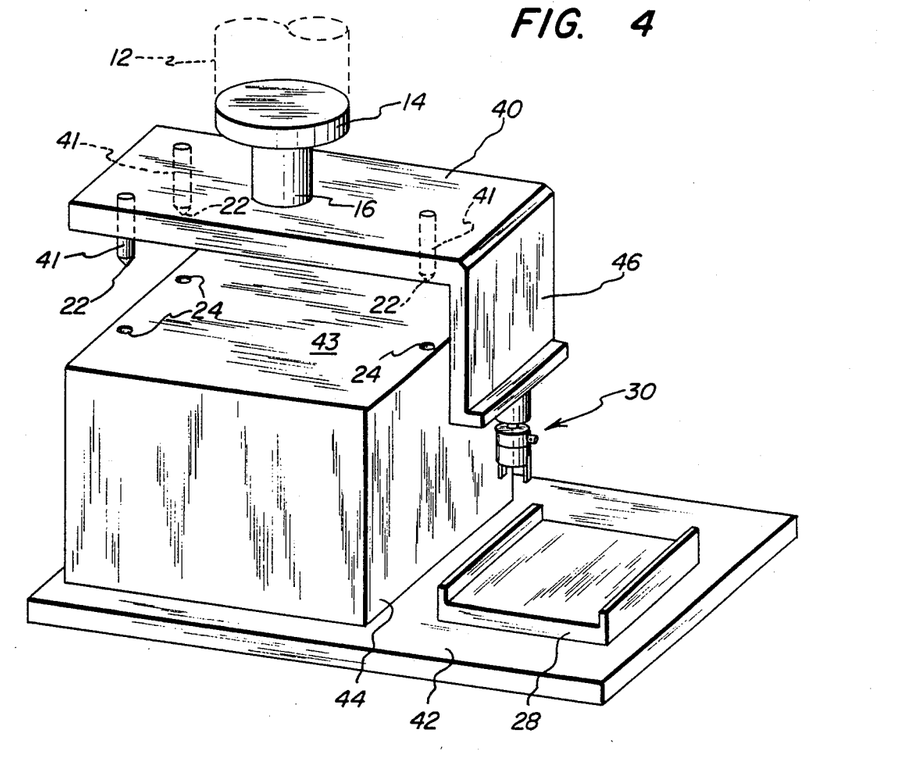
FIG. 4 is a perspective view of still another embodiment of the present invention wherein the end effector is part of the system and is offset from the first and second docking means.
Figure 5:
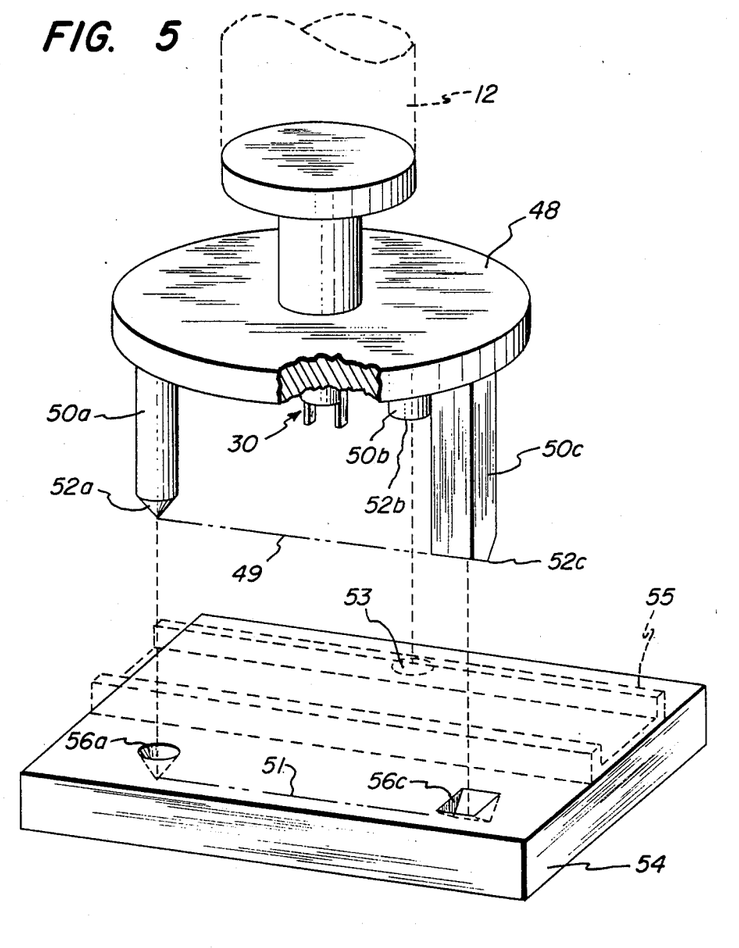
FIG. 5 is a perspective view of yet another version of the present invention wherein the first and second docking means comprise various configurations.

Several alternate embodiments of the FIG. 1 version of the invention are illustrated separately in FIGS. 3, 4 & 5. In these embodiments, parts identical to those of the FIG. 1 version are denoted by similar numerals. Referring first to FIG. 3, closed loop system 31 includes mounting plate 14, compliant coupling 16 and upper fixture plate 18. Attached to plate 18 are three legs 32 of a shorter length than legs 20 illustrated in the FIG. 1 version. A lower fixture plate 34 includes opposed sidewalls 36 and ports 24 appropriately located on the upper edges 38 thereof. As with the other embodiments illustrated herein, the configuration of the closed loop system is dictated largely by the size and configuration of the workpiece or part positioned within the workpiece fixture, and the operational task to be performed by the end effector.

Another variation of the invention is depicted in FIG. 4. Plate 14 is fixedly mounted to manipulator 12 and compliant coupling 16 connects plate 14 to an upper fixture plate 40. Depending from plate 40 are three positioning legs 41 of the short version illustrated in FIG. 3. Free ends 22 of legs 41 are again male conical shaped and communicate with female conical shaped ports 24. As shown, ports 24 are appropriately positioned within the upper surface 43 of a raised pad 44 offset from part fixture 28. Pad 44 may be either fixed to or integral with the lower fixture plate 42. End effector 30 is connected to a depending member 46 at one end of upper fixture plate 40 such that it is above part fixture 28 for performance of the desired operational task on the workpiece (not shown).

The FIG. 5 version of the invention includes positioning legs which have different free end configurations. As before, an upper fixture plate 48 has three legs depending therefrom; however, in this embodiment the three legs 50a, 50b, and 50c have three different mating surfaces at their free ends 52a, 52b, and 52c, respectively. Specifically, end 52a includes a male conical-shaped surface, end 52b has a flat surface and end 52c has a male wedge-shaped surface. Only ends 52a and 52c are designed to dock within corresponding female ports appropriately positioned and configured within a lower fixture plate 54, namely, a conical-shaped port 56a and a wedge-shaped port 56c, respectively. Flat surface end 52b simply contacts upper surface 53 of lower fixture plate 54. Wedge-shaped end 52c and its corresponding port 56c are arranged such that imaginary lines 49 and 51 connecting free ends 52c and 52a, and ports 56c and 56a, respectively, are parallel in order to ensure a proper rotational orientation for end effector 30.

This alternate docking configuration is presently believed preferable as a practical implementation of the invention. Most of the positioning references are still drawn from the docking of male conical-shaped end 52a and its corresponding female conical-shaped port 56a. Male wedge-shaped end 52c determines orientation of the closed loop reference frame in the plane of lower fixture plate 54 as well as determining, in combination with leg 50b, proper orientation of the manipulator 12 perpendicular to the plane of lower fixture plate 54. Again, a part fixture 55 can be either secured to or integral with lower plate 54.

Figure 6:
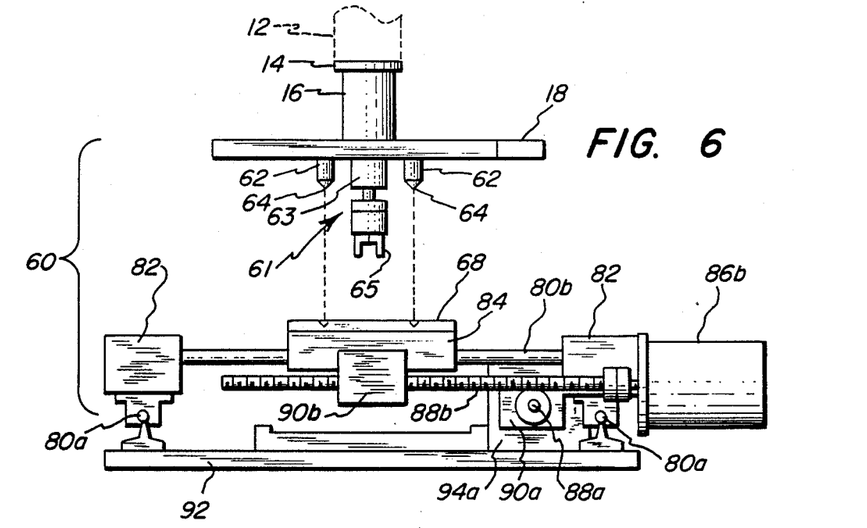
FIG. 6 is a front elevational view of a further embodiment of the present invention wherein the second positioning means is movable by an XY table positioning system relative to the workpiece fixture.
Figure 7:
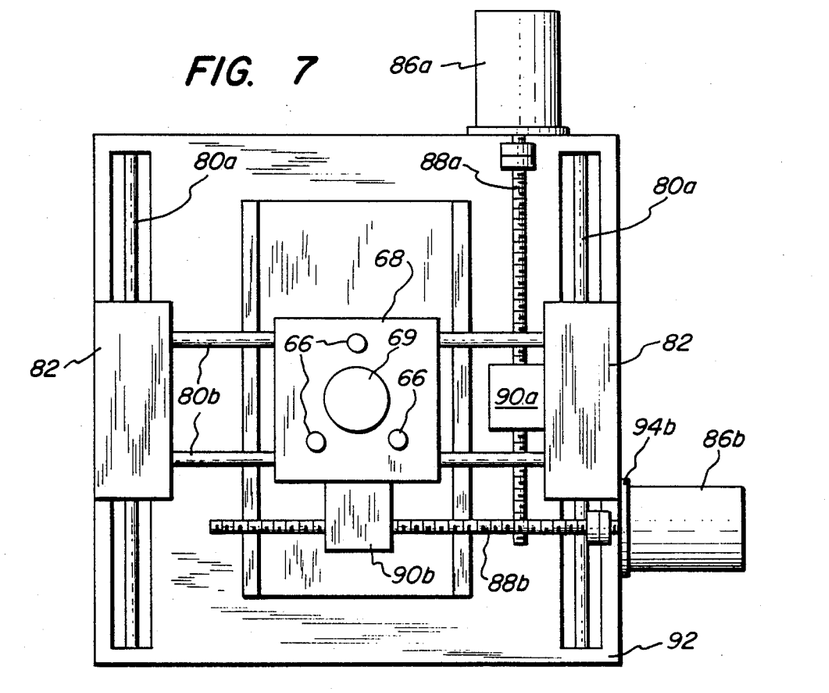
FIG. 7 is a plan view of the workpiece fixture, second postioning means and XY table positioning system subassembly of FIG. 6.

A different embodiment of a mechanical closed loop system 60 of the present invention is illustrated in FIGS. 6 & 7. This embodiment is particularly useful when the fixtured workpiece is larger than acceptable spacing for the system's locating legs, such as is often the case with the setting of surface mounted chips onto a printed circuit board. As before, parts identical to those in previous embodiments are denoted by similar numerals.

Compliant coupling 16 connects upper fixture plate 18 to mounting plate 14 which is attached to manipulator arm 12. Extending from upper fixture plate 18 are three positioning legs 62 each of which have a male conical-shaped free end 64. Also depending from plate 18 is an end effector 61. Ends 64 dock in corresponding female conical-shaped receptacles or ports 66 in a movable lower fixture plate 68. An XY table positioning device is utilized to precisely locate movable plate 68 relative to the printed circuit board or other workpiece. Lower plate 68 includes an opening 69 through which end effector 61 communicates with the workpiece to perform the desired operational task. For the surface mounted chip—printed circuit board embodiment, end effector 61 comprises a specific single degree of freedom mounting actuator 63 and a gripper 65 designed to handle the surface mounted chips. A second degree of freedom to allow for rotation of the chip in the plane of the printed circuit board may exist within actuator 63.

The XY table positioning system which moves plate 68 locates the plate over the printed circuit board such that once ends 64 dock within ports 66, actuator 63 and gripper 65 are properly located over the desired operational task position. The XY table positioning system can be implemented by those skilled in the art in any one of numerous ways. For example, the illustrated embodiment includes a first and second pair of parallel linear guideways 80a and 80b, respectively. The second pair of guideways 80b is arranged substantially perpendicular to the first pair 80a and is mounted thereto via a first pair of linear bearings 82 such as to be capable of traversing the first pair of guideways. A second pair of linear bearings 84 allows for translation of lower fixture plate 68 relative to the second pair of linear guideways 80b. A first drive means comprising a stepper motor or servomotor 86a, a lead screw or ball screw 88a and a ball nut 90a controls movement of the top assembly along the first pair of guideways. Motor 86a is connected to the base structure 92 by a motor mount 94a.

A second identical drive means, mounted to travel along the first pair of parallel linear guideways 80a, directs movement of the lower fixture plate 68 along the second pair of linear guideways. Namely, a second stepper motor or servomotor 86b drives a second ball nut 90b along a second lead screw or ball screw 88b. Motor 90b is connected to the lower drive assembly by a mount 94b.

The speed of the XY table positioning system must be such that lower fixture plate 68 is at the desired location before the manipulator arm is ready to dock thereto by means of the positioning legs. This is not believed problematic since the XY table system need not move the lower fixture plate a large displacement per cycle compared to the displacement of the robotic manipulator.

Figure 8:
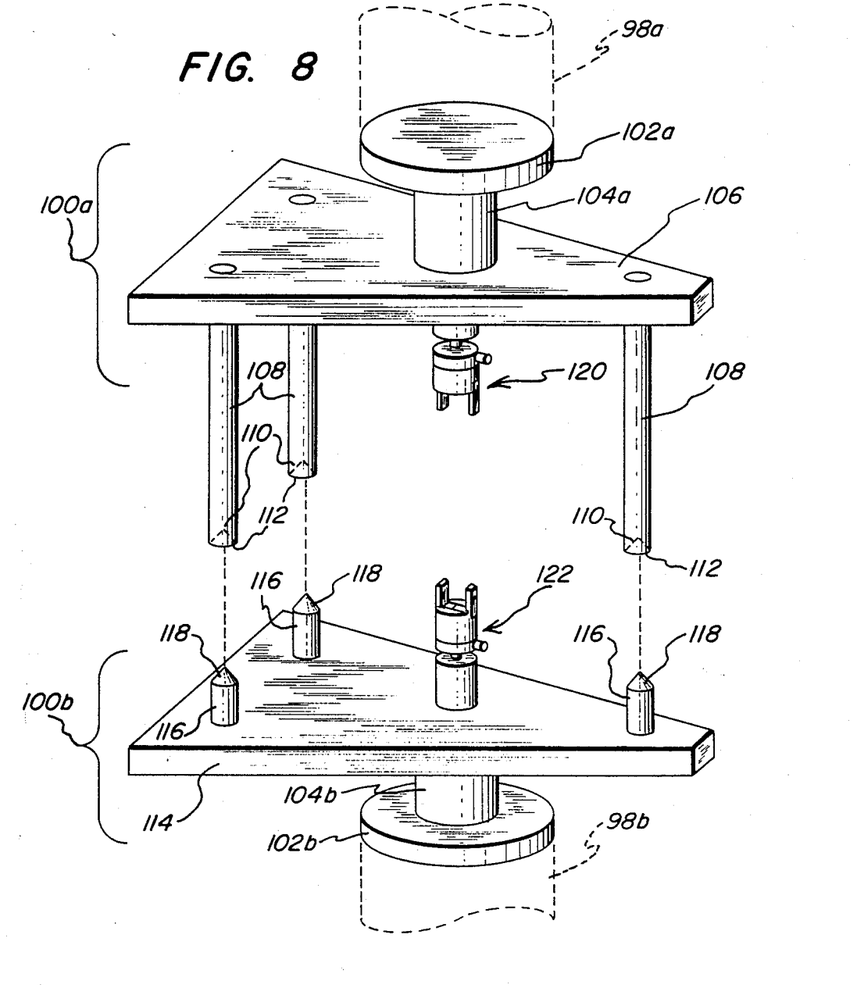
FIG. 8 is a perspective view of a two robotic arm end effector closed loop locating system embodiment of the present invention.
Figure 9:
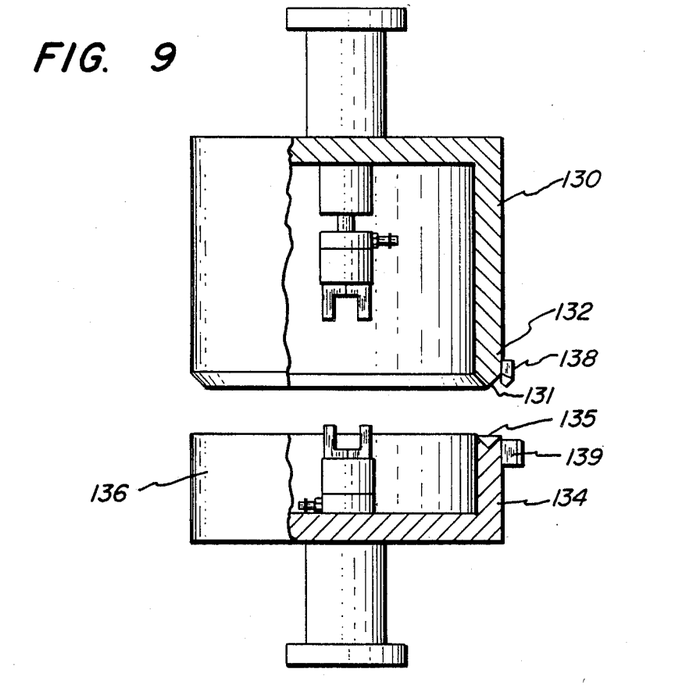
FIG. 9 is a partially cutaway elevational view of an alternate version of the two arm embodiment of FIG. 8.
Figure 10:
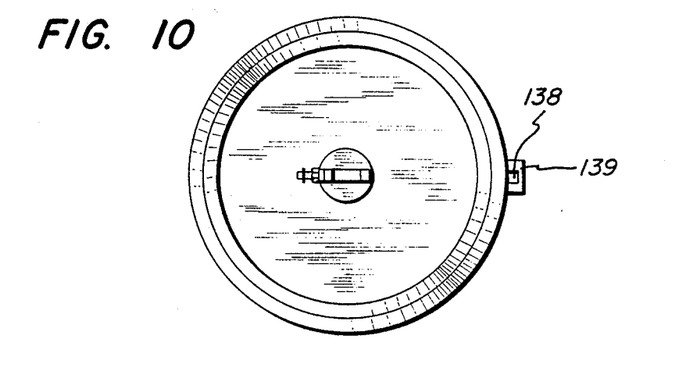
FIG. 10 is a top plan view of the embodiment depicted in FIG. 9.

Still another embodiment of the invention is illustrated in FIGS. 8-10. This embodiment is utilized when performing a desired operational task utilizing two (or more) robotic manipulators 98a and 98b. The system allows for some of the typical coordinated robot manipulator control problems to be eliminated through creation of a mechanical closed loop reference frame. A first wrist assembly 100a attaches to manipulator arm 98a by mounting plate 102a, which again is affixed thereto by any common means. A compliant coupling 104a connects plate 102a to an upper fixture plate 106 which has three legs 108 depending therefrom. The free ends 110 of each leg 108 have female conical-shaped receptacles or ports 112 therein. Similarly, second wrist assembly 100b is mounted robotic manipulator 98b by mounting plate 102b. Compliant coupling 104b connects mounting plate 102b with a lower fixture plate 114 which also has three positioning legs 116 affixed thereto. Legs 116 each have a male conical-shaped free end 118. Ends 118 are positioned and configured to engagably mate with the conical-shaped ports 112 when robotic manipulators 98a and 98b reach their programmed target coordinates, thereby forming a closed loop reference frame. As with the other embodiments, such a closed loop reference frame separates operation of a first end effector 120 connected to the upper fixture plate and a second end effector 122 connected to the lower fixture plate from inaccuracies or vibrations of the robotic manipulators 98a and 98b. End effectors 120 & 122 may be of similar or different construction depending upon the task to be performed. Also, other robotic manipulators can be docked in a similar manner if one or both of the fixture plates have additional male/female conical shaped locating means to accomodate such multiple dockings.

An alternate version of the two robotic manipulator docking embodiment of the invention is illustrated in FIGS. 9 & 10. In this version, the upper fixture plate and its depending legs have been replaced by a first cylindrical fixture plate 130 which has a male configured edge 131 at its free end 132. A corresponding second cylindrical shaped fixture plate 134, having a female receptacle or port 135 at its free end 136, replaces the lower fixture plate with its depending legs of FIG. 8 embodiment. A rotational orientation pin 138 docks to a rotation receptacle 139 to ensure a correct degree of rotation.

Although several embodiments of the mechanical closed loop system of the present invention have been illustrated in the accompanying drawings and described in the foregoing detailed description, it will be understood that the invention is not limited to the particular embodiments described herein but is capable of numerous rearrangements, modifications and substitutions without departing from the scope of the invention. For example, the male conical leg ends and corresponding female conical ports can be alternatively located on the upper and lower fixture plates as desired. In addition, other geometric configurations besides the discussed conical, flat and wedge shaped surfaces may be utilized. Other changes will suggest themselves to those skilled in the art. The following claims are intended to encompass all such modifications.

I claim:

1. A mechanical closed loop system for translationally locating along X, Y, Z axes and rotationally locating about each of said X, Y, Z axes the distal end of a robotic arm relative to a workpiece fixture, the distal robotic arm end having an independently operated micro-robotic manipulator affixed thereto for performance of high precision tasks on a workpiece positioned on said fixture, said system comprising:

a wrist assembly mountable to the robotic arm, said assembly having a compliant member and a first positioning member connected to the compliant member, said first positioning member including a first docking means;

a second positioning member associated with the workpiece fixture, said second positioning member including a second docking means;

said first docking means and said second docking means comprising:

(i) a first positioning leg connected to one of said first positioning member and said second positioning member and a first positioning port associated with the other of said first positioning member and said second positioning member, said first positioning port having a tapered lead in configured to engagably receive and position said first positioning legs free end as the robotic arm attains a target position relative to the workpiece fixture;

(ii) a second positioning leg connected to one of said first positioning member and said second positioning member and a second positioning port associated the other of said first positioning member and said second positioning member, said second positioning port having a tapered lead in configured to engagably receive and position said second positioning leg's free end as the robotic arm attains its target position relative to the workpiece fixture;

(iii) a third positioning leg connected to one of said first positioning member and said second positioning member, said third positioning leg being sized and configured such that its free end engages the other of said first positioning member and said second positioning member when the robotic arm attains its target position relative to the workpiece fixture;

said compliant member providing rotational and translational freedom of movement for said first docking means to precisely position itself with respect to and interlock with said second docking means to ensure that the robotic arm attains the desired three-dimensional coordinates and three-dimensional rotational orientation relative to the workpiece fixture; and said micro-robotic manipulator being located intermediate said first positioning member and said second positioning member when said first docking means and said second docking means are interlocked, whereby docking of said first and second positioning members produces a translational and rotational six-degree of freedom mechanical closed loop reference frame which separates operation of the independent micro-robotic manipulator from gross movement inaccuracies and vibrations of the robotic arm.

2. The mechanical closed loop locating system of claim 1, wherein the robotic arm includes the independent micro-robotic manipulator and the wrist assembly is mountable to the robotic arm without impairing functioning of the arm's micro-robotic manipulator.

3. The mechanical closed loop locating system of claim 1, wherein the locating system further comprises the independent micro-robotic manipulator and said micro-robotic manipulator is secured to the wrist assembly.

4. The mechanical closed loop locating system of claim 1, wherein said first positioning member includes said positioning legs and said positioning ports are associated with said second positioning member.

5. The mechanical closed loop locating system of claim 1, wherein said positioning ports are associated with said first positioning member and said second positioning member has said positioning legs.

6. The mechanical closed loop locating system of claim 1, wherein said positioning legs are each substantially straight and of fixed length.

7. The mechanical closed loop locating system of claim 1, wherein said first positioning legs free end is male conical shaped and said first positioning port is female conical shaped.

8. The mechanical closed loop locating system of claim 1, wherein said second positioning leg's free end is male wedge shaped and said second positioning port is female wedge shaped.

9. The mechanical closed loop locating system of claim 7, wherein said second positioning leg's free end is male wedge shaped and said second positioning port is female wedge shaped.

10. The mechanical closed loop locating system of claim 9, wherein said wedge-shaped free end and port are arranged colinear to lines connecting said conical-shaped free end and port and said wedge-shaped free end and port.

11. The mechanical closed loop locating system of claim 9, wherein said third positioning leg's free end is flat.

12. The mechanical closed loop locating system of claim 7, further comprising a third positioning port associated with the one of said first positioning member and said second positioning member not having said third positioning leg, said third positioning port being configured to matably receive within the robotic arm's resolution said third positioning leg's free end as the robotic arm attains its target position relative to the workpiece fixture.

13. The mechanical closed loop locating system of claim 12, wherein said second and third positioning legs' free ends are each male conical shaped and said second and third positioning ports are each female conical shaped.

14. The mechanical closed loop locating system of claim 1, wherein the positioning legs form a triangular-shaped configuration when said first and second members are docked and wherein the micro-robotic manipulator is located within said triangular-shaped configuration.

15. The mechanical closed loop locating system of claim 1, wherein the positioning legs form a triangular-shaped configuration when said first and second members are docked and wherein the micro-robotic manipulator is offset from said triangular-shaped configuration.

16. The mechanical closed loop locating system of claim 15, wherein the workpiece fixture includes a pad which is offset from a workpiece when the workpiece is positioned within said fixture, said pad having said second positioning member associated therewith.

17. The mechanical closed loop locating system of claim 16, wherein said pad terminates above the workpiece when positioned within said fixture and wherein said positioning ports are associated with said second positioning member.

18. The mechanical locating device of claim 1, wherein said ports are associated with said second positioning member and wherein said second positioning member is integral with said workpiece fixture.

19. The mechanical closed loop locating system of claim 1, wherein said wrist assembly is detachably mountable to the robotic arm.

20. The mechanical closed loop locating system of claim 1, wherein said compliant member is manufactured of rubber.

21. The mechanical closed loop locating system of claim 1, wherein said compliant member is manufactured of elastomeric material.

22. The mechanical closed loop locating system of claim 1, wherein said compliant member includes a spring.

23. The mechanical closed loop locating system of claim 1, wherein said compliant member is manufactured of at least two of rubber, elastomeric material, and a spring.

* * * * *